(12) United States Patent
Gambuzza

(10) Patent No.: US 6,226,331 B1
(45) Date of Patent: May 1, 2001

(54) DATA ACCESS ARRANGEMENT FOR A DIGITAL SUBSCRIBER LINE

(75) Inventor: Michael J. Gambuzza, Boston, MA (US)

(73) Assignee: C. P. Clare Corporation, Beverly, MA (US)

( * ) Notice: Subject to any disclaimer, the term of this patent is extended or adjusted under 35 U.S.C. 154(b) by 0 days.

(21) Appl. No.: 09/404,006

(22) Filed: Sep. 23, 1999

Related U.S. Application Data

(63) Continuation-in-part of application No. 09/191,403, filed on Nov. 12, 1998.

(51) Int. Cl.[7] .................................................. H04L 25/00
(52) U.S. Cl. ........................ 375/258; 375/220; 379/413
(58) Field of Search ..................................... 375/219, 220, 375/222, 258, 257; 455/279.1, 280, 282; 353/24 R, 25, 26, 35; 330/154; 340/310.07; 379/399, 413, 93.05, 422

(56) References Cited

U.S. PATENT DOCUMENTS

| | | | |
|---|---|---|---|
| 4,417,099 | 11/1983 | Pierce | 179/2 |
| 4,607,139 | 8/1986 | Froment et al. | 179/2 |
| 4,841,561 | 6/1989 | Hill | 379/97 |
| 4,951,309 | 8/1990 | Gross et al. | 379/98 |
| 5,086,454 | 2/1992 | Hirzel | 379/98 |
| 5,369,666 | 11/1994 | Folwell et al. | 375/8 |
| 5,369,687 | 11/1994 | Farkas | 379/98 |
| 5,384,808 * | 1/1995 | Van Brunt et al. | 375/36 |
| 5,473,552 | 12/1995 | Chen et al. | 364/514 |
| 5,500,895 | 3/1996 | Yurgelites | 379/412 |
| 5,555,293 | 9/1996 | Krause | 379/98 |
| 5,598,455 | 1/1997 | Bliven et al. | 379/27 |
| 5,608,447 | 3/1997 | Farry et al. | 348/7 |
| 5,655,010 | 8/1997 | Bingel | 379/93.28 |
| 5,737,397 | 4/1998 | Skinner et al. | 379/93.29 |
| 5,809,395 * | 9/1998 | Hamilton-Piercy et al. | 455/4.1 |
| 5,850,431 | 12/1998 | Satou | 379/93.09 |
| 5,898,908 * | 4/1999 | Griffin et al. | 455/127 |
| 5,900,683 * | 5/1999 | Rinehart et al. | 307/129 |
| 6,005,884 * | 12/1999 | Cook et al. | 375/202 |
| 6,009,314 * | 12/1999 | Bjork et al. | 455/83 |
| 6,107,948 * | 8/2000 | Scott et al. | 341/143 |
| 6,124,756 * | 9/2000 | Yaklin et al. | 327/564 |
| 6,144,736 * | 7/2000 | Koenig et al. | 379/399 |

* cited by examiner

*Primary Examiner*—Chi Pham
*Assistant Examiner*—Emmanuel Bayard
(74) *Attorney, Agent, or Firm*—McDermott, Will & Emery

(57) ABSTRACT

An improved line interface device and an improved xDSL modem for use in connecting data communications equipment to a xDSL line is disclosed. The line interface device provides the required isolation between the xDSL line and the communications equipment using optical isolation or capacitive techniques, as well as provides the power necessary to produce the transmit signal levels required by the communications services by utilizing a switching power supply deriving its power from a source isolated from the line, and including a transformer for isolating the source from the xDSL line. By switching at high frequencies the size of the transformer can be sufficiently small so that the interface device and supply can be provided in accordance with small form factor requirements.

56 Claims, 3 Drawing Sheets

DATA ACCESS ARRANGEMENT FOR A DIGITAL SUBSCRIBER LINE

CROSS-REFERENCE TO RELATED APPLICATIONS

This application is a continuation-in-part of U.S. patent application Ser. No. 09/191,403 filed Nov. 12, 1998, and assigned to the present assignee.

STATEMENT REGARDING FEDERALLY SPONSORED RESEARCH

Not Applicable

REFERENCE TO MICROFICHE APPENDIX

Not Applicable

BACKGROUND OF THE INVENTION

This invention relates to line interface devices or data access arrangements (DAA) for communications and, more particularly, to a line interface device which provides galvanic isolation between data communications equipment and a digital subscriber line (DSL).

Wide area networks (WANs) are used to transfer data over long distances and large geographic areas. These networks utilized communications equipment, typically modems, to convert the digital data to a format compatible with the appropriate transmission standard used by the WAN service. For example, analog modems convert digital data to a data stream encoded in an audio carrier signal which can be transmitted and received over ordinary telephone lines in accordance with the ITU-T V.34 and V.90 standards. Other types of WAN services, such as Digital Subscriber Line (DSL) and Broadband Cable services utilize xDSL and Cable modems, respectively, to transfer data over the respective WANs. Digital Subscriber Line technology currently enables users to obtain over 6 Mbps data transfers from the Central Telephone Office (CO) to the user over ordinary existing copper telephone line pairs. There currently exist several different types of DSL services, and accordingly as used herein, the term "xDSL" is intended to include all the different types of DSL services including, for example, Asymmetrical DSL (ADSL).

The latter provides a data rate which is different depending on which direction the data is being transmitted. Currently, ADSL modems typically support a rate of about 6 Mbps downstream and a rate of about 640 Kbps upstream (where "upstream" is defined as data from the user to the CO, and "downstream" is defined as data from the CO to the user). The asymmetric nature of the technology makes it suitable for Internet access since the majority of data in an Internet connection is transmitted downstream to the user, with mouse key clicks being the majority of data sent upstream.

In general, WAN service providers, for example, the local telephone company, typically require a certain level of electrical or galvanic isolation between the communications equipment and the WAN medium. Isolation is required in order to provide a level of fault tolerance in the WAN service provider's network. It is desirable that if a piece of communications equipment connected to the WAN fails, it does not damage or interfere with the communications medium or other devices connected to the communications medium.

Thus, where an xDSL modem is used at the user location, there exists the same interface device requirements of the standard analog modem such as: signal coupling to the telephone line, isolation of the modem from the telephone line; over voltage and surge protection; and a 2-4 wire hybrid.

Typically, the industry standards require 1500 volts of galvanic isolation between the line and modem circuitry. In current xDSL equipment, isolation is provided by a coupling transformer connected between the modem and the telephone line. While the coupling transformer can provide the necessary line isolation, coupling transformers are typically too large and bulky (in the order of 0.5 cubic inches) to be used in devices requiring a small form factor, such as the credit card sized PC Card which may be used with a notebook computer.

Optical isolation interface devices have been proposed for interfacing analog modems and an analog wide area network because, among other things, they take up less space and are amenable to IC implementation. Until the present invention, however, optical isolation interface devices have been considered impractical for interfacing xDSL modems with an xDSL line. More specifically, optical interface devices usually include drivers on the "line" side of the interface device, requiring a certain amount of power from the line side of the interface device to operate these drivers. Implementing the arrangement with an analog modem and analog line is relatively straight forward since power is available, and therefore can be derived from the telephone line to operate the line drivers of the interface device so that isolation is preserved. Unfortunately, with xDSL, there is either no power available from the line or the power required by the line drivers of an optical isolation interface device is substantially greater than can be derived from the line.

To facilitate a better understanding of the foregoing, reference is made to FIG. 1 which shows a typical unit of data communications equipment (DCE), and more specifically a modem 100, which is adapted for using industry standard data communications protocols to transfer data over a wide area communications network (WAN). The modem 100 includes a modem controller 120 which is adapted for controlling substantially all of the operations of the modem 100. The modem controller 120 is adapted, via a communications interface device 110, for receiving data from and transmitting data to the local DTE (data terminal equipment) (not shown). The data to be transmitted to the remote DTE is formatted in accordance with the appropriate data communications protocol and transferred, via an internal bus 130, to the data pump 140. Similarly, data from the remote DTE is extracted from the protocol data units (PDUs) received from the data pump by modem controller 120 and transferred to the local DTE. The data pump 140 transfers data to and receives data from the line interface device 200 via internal bus 150. The line interface device 200, which is sometimes referred to as a "data access arrangement" or DAA, is connected to the telephone line 12 and transfers data to and from the communications network 10.

In the case of xDSL the arrangement is similar to existing analog modem front ends with some fundamental differences. While the DSL modem can operate on existing telephone lines, it is required that equipment changes at the CO be made to accommodate this new technology. Some of the significant differences related to the line interface device are:

|  | Analog Modem | DSL Modem |
| --- | --- | --- |
| Bandwidth | 300 Hz–3400 Hz | 300 Hz–1.1 MHz |
| Power level | 0 dBm Max | +26 dBm Max |
| Line Impedance | 600Ω | 130Ω |

Most telephone lines made of copper wire can support 1.1 Mhz when they are unloaded. Loaded lines are lines which have large inductors placed in series at certain locations along the line to improve voice response. Unfortunately, these inductors form a low pass filter which hampers high speed data connections. These inductors must be removed in most cases for xDSL communications to achieve full speed of data throughput. Fortunately, most lines do not have loading inductors and the ones that do are usually restricted to rural lines over long distances.

Until recently, the high power required to support ADSL with Discrete Multitone Modulation (DMT) is +26 dBm. In order to achieve this power level, 15V power supplies are required for the line drivers and, in addition, the coupling transformer is usually a step up type as opposed to a 1:1 ratio. More recently, the power requirements have been somewhat relaxed so that 10V power supplies are required.

It is clear that two major drawbacks to the existing design are that designers must provide dual 15V or 10V power supplies in addition to the requisite +5V usually required for system operation. Further, the transformer size is relatively large making the overall interface device cumbersome.

SUMMARY OF THE INVENTION

The invention relates to an improved line interface device and an improved xDSL modem for use in connecting data communications equipment to a xDSL line.

In accordance with one aspect of the invention, an isolated power supply is used to power the line drivers of an interface device used to connect communication equipment to an xDSL line. The switching power supply is used to step up the commonly available voltages of +3.3V and +5V (in commercially available computer systems and thus on the equipment side of the optical isolator) to the desired voltage for the line drivers. While the isolated power supply includes a transformer to step up the voltage, the switching supply can operate in excess of 1 Mhz so as to greatly reduce the size of the transformer used to step up the voltage, and allow all of the circuitry of the interface device to be integrated in a small IC package, and is thus useful for small form factor designs. In one preferred embodiment of the invention, the switching supply can be a resonant mode switcher so as to further reduce the size of the magnetic circuit.

In accordance with another aspect of the present invention, an improved line interface device provides the required isolation between the xDSL line and the communications equipment using optical isolation techniques, as well as provides the power necessary to produce the transmit signal levels required by the communications services.

In accordance with another aspect of the invention, the line interface device provides the required galvanic isolation between the xDSL line and the communications equipment using capacitance techniques, as well as provides the power necessary to produce the transmit signal levels required by the communications services.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The present invention is directed to an isolated line interface device or DAA for use in data communications equipment (DCE), and in particular xDSL modems. An xDSL modem is typically connected between a local unit of data terminal equipment (DTE), such as a computer terminal, computer system or personal computer, and a data communications network in the form of a xDSL line, and enables the local DTE to send data to and receive data from a remote DTE. The local xDSL modem receives data from the local DTE and converts that data into a format compatible with the xDSL line in order to enable the data to be transmitted over the xDSL line to the remote DTE. Similarly, the local xDSL modem receives data from the xDSL line and converts that data into a format that can be communicated to the local DTE. The interface is part of the physical layer interface that connects the xDSL modem to the xDSL line.

Figure 1:
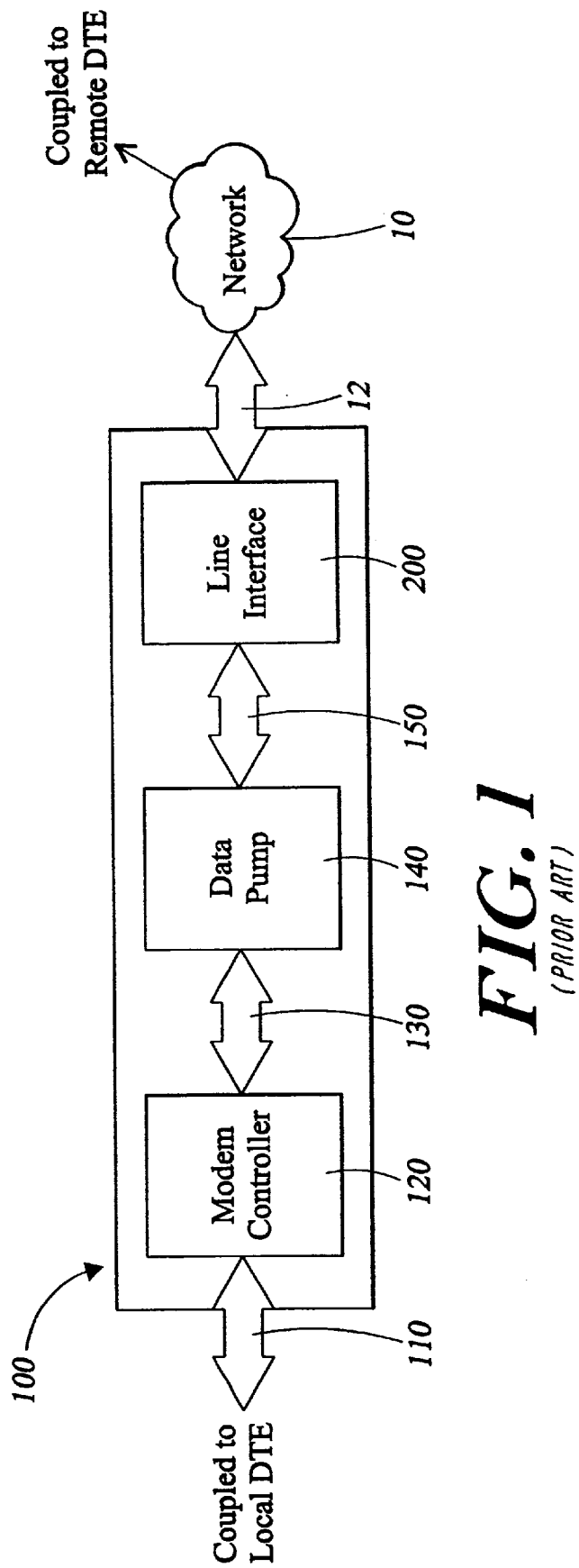
FIG. 1 is a diagrammatic view of a conventional modem.
Figure 2:
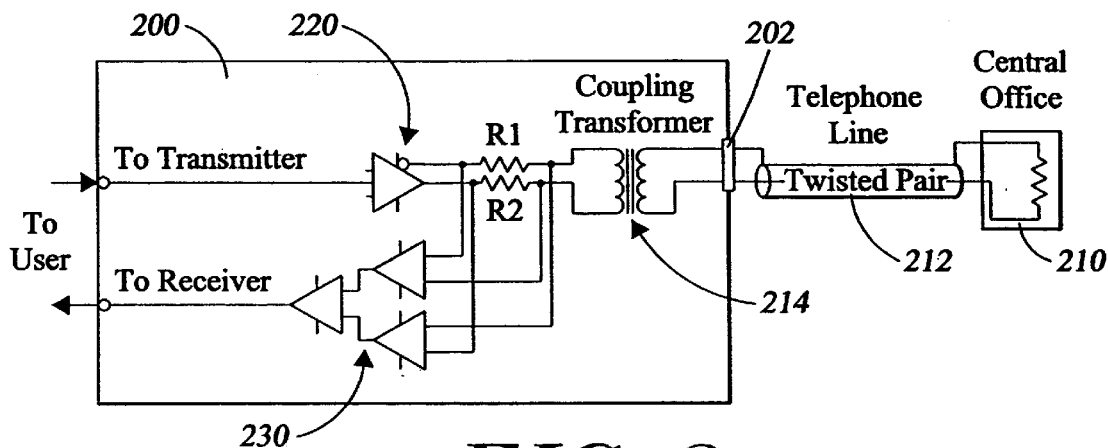
FIG. 2 is a diagrammatic view of a prior art line interface device.

FIG. 2 shows a prior art xDSL interface device 200 in an xDSL modem which is connected to an xDSL line via a telephone line 212 to the telephone company central office 210. Typically, the telephone line 212 is a twisted pair type data communications medium (usually made of copper) which is run from the local telephone company central office 210 to a user (not shown). The telephone company central office 210 serves as the access point for the communications network and terminates the subscribers connection to the network. The telephone line 212 is ultimately connected to the line interface or DAA 200 of the xDSL modem usually by a relatively short cable that plugs into connector 202, typically an RJ-11 or RJ45 type connector. The prior art line interface 200 includes a coupling transformer 214, which in turn connects the differential line transmit driver 220 and the differential line receiver 230 to the connector 202 and the telephone line 212. Resistors R1 and R2 provide a matching impedance to the line, and current limiting on the output of differential line driver 220 and the input to the differential line receiver 230. The coupling transformer 214 provides the line isolation between the xDSL modem and the telephone line 212 as may be required by the local telephone.

The differential line transmit driver 220 is adapted to detect a differential signal, usually an analog data signal (typically from 0 to +5 volts), from the transmitter of the data pump (not shown) via a pathway between the driver 220 and the data pump. The differential signal is then coupled to a single ended amplifier, which in turn produces the data signal used to transmit the data over the communications network. Similarly, the differential line receiver 230 is adapted to receive a differential data signal from the communications network and produce a data signal, also usually an analog data signal (typically between 0 to +5 volts), which is transmitted to the receiver of the data pump via a signal path between the differential line receiver 230 and the data pump. The differential line receiver 230 shown in FIG. 2 is a 2–4 wire hybrid differential to single ended line receiver. The hybrid differential line receiver 230 is used because xDSL signals are full duplex signals that are transferred over a single twisted pair of wires. The 2–4 wire hybrid differential to single ended line receiver provided by the receiver 230 filters out the signal transmitted by the differential line driver 230 such that only the signal received from the telephone line 212 is transferred to the receiver of the data pump. As is evident from FIG. 2, all of the drivers lie on the user side of the isolation interface provided by the coupling transformer 212 so that the power required to operate the drivers can be derived from the user's equipment. However, in this arrangement the transformer 212, designed to meet the requirements for providing 1500 volts of galvanic isolation, is too large and bulky (in the order of 0.5 cubic inches) to be used in devices requiring a small form factor, such as the credit card sized PC Card which may be used with a notebook computer.

Figure 3:
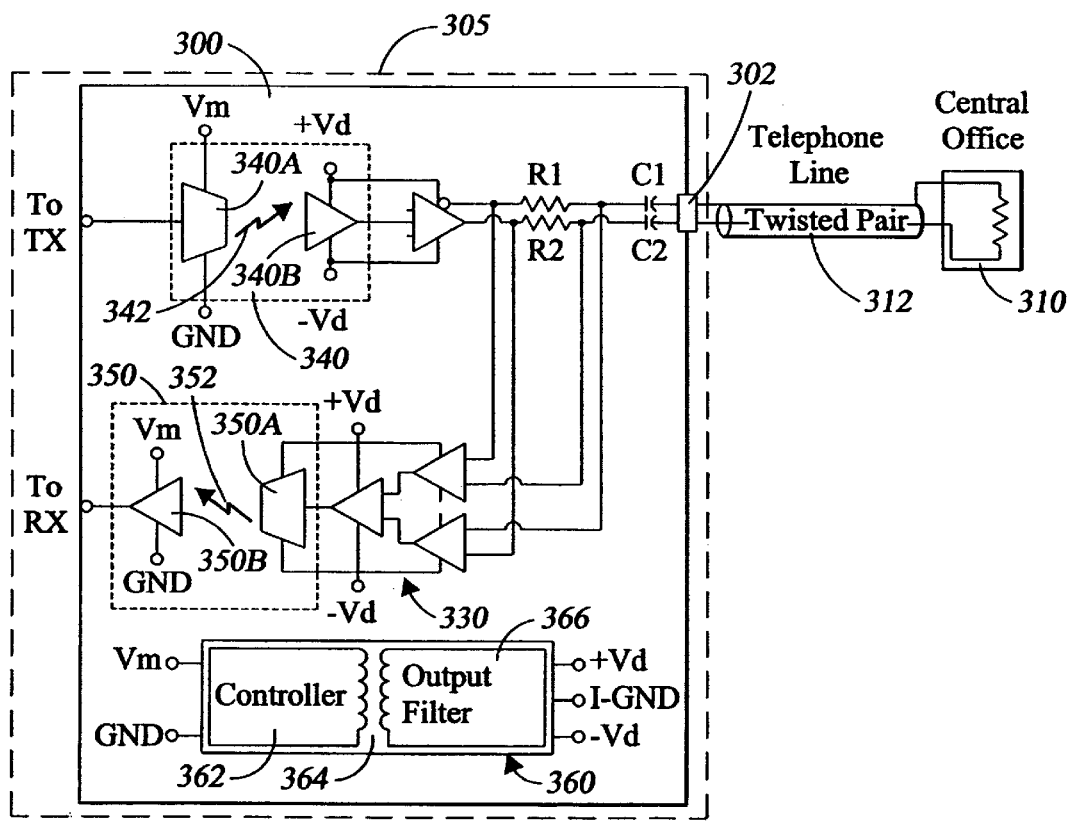
FIG. 3 is a diagrammatic view of one embodiment of a line interface device in accordance with the present invention using optical isolation techniques.

FIG. 3 shows a preferred embodiment of an isolated line interface 300 constructed in accordance with the present invention. In the preferred embodiment, the isolated line interface or DAA 300 is part of an xDSL modem 305 which is connected to a xDSL line via a telephone or cable line 312 to the telephone or cable company central office 310. A connector 302, for example, an RJ-45 or RJ-11 connector, can be provided to connect the modem to the line 312. The line 312 is shown as a twisted pair (commonly made of copper), but it should be appreciated that other types of communication links can be provided, including coaxial cable and even RF links. Capacitors C1 and C2, and back termination resistors R1 and R2 connected in series with capacitors C1 and C2 respectively, are provided between the respective terminals of the connector 302 and each of the (1) inputs to the differential line receiver 330 and (2) outputs of the differential line transmitter 320. Line receiver 330 is a 2–4 wire hybrid differential to single ended line receiver adapted to detect a differential signal, usually an analog data signal (typically between 0 and +5 volts) transmitted from the line 312 to the receiver. Line transmitter 320 is adapted to detect a differential signal, usually an analog data signal (typically from 0 to +5 volts), from the transmitter of the data pump (not shown) via a pathway between the driver 320 and the data pump to be described hereinafter. The transmitter 320 produces the data signal used to generate data over the communications network. Capacitors C1 and C2 provide DC voltage and low frequency isolation between the line 312 and the local DTE because in typical applications, xDSL service is provided over ordinary telephone lines which are also used for voice services which are capable of generating DC and low frequency signals on the line.

The isolated line interface device 300 in accordance with the present invention further includes a transmit isolation amplifier 340 coupled between the line driver 320 and the transmitter of the data pump (not shown) and a receive isolation amplifier 350 coupled between the differential line receiver 330 and the receiver of the data pump. Preferably, the isolation amplifiers 340 and 350 which preferably include optocouplers, the latter comprising high speed fiber optic LEDs, or the like, so as to provide high signal throughput at high frequencies with little or no distortion within the bandwidth of the signals transmitted there through.

Preferably, the transmit isolation amplifier 340 is adapted to receive an analog signal (typically between 0 and +5 volts) from the transmitter of the data pump and produce a differential signal output, which in turn is transmitted to the differential line driver 320 and the receive isolation amplifier 350 is adapted to receive a differential signal from the differential line receiver 330 and produce an analog level signal (typically between about 0 and +5 volts) which is transmitted to the receiver of the data pump.

Preferably, each isolation amplifier 340, 350 includes a transmitter first amplifier stage 340A, 350A and receiver second amplifier stage 340B, 350B. The transmitter stages 340A, 350A transmit the respective data signals to the corresponding receivers 340B, 350B over the corresponding optical paths 342 and 352, respectively, while maintaining the required electrical isolation between the circuit coupled to the transmitter 340A, 350A and the circuit coupled to the receiver 340B, 350B, typically 1500 volts or more. It can be seen that the optical paths provide the isolation between the user and the line, and that the components 320, 340B, 330 and 350A all lie on the line side of the isolation provided by the optocoupler.

In accordance with one aspect of the present invention, because one cannot draw sufficient power from the line 312 to power the components of the interface device on the line side, the isolated line interface device 300 also includes an isolated power source 360 adapted for providing power to the portion of the interface device 300 between the optical paths 342 and 352, on the one hand and the connector 302 on the other hand. Thus, source 360 powers the receiver 340B of the transmit isolation amplifier, the differential line driver 320, the transmitter 350A of the receive isolation amplifier and the differential isolation receiver 330. Preferably, the isolated power source 360 is capable of producing an isolated differential voltage, Vd, which can be as much as ±15 volts and approximately 0.5 watts of power and an isolated ground, I-Gnd.

In the preferred embodiment, the isolated power source 360 includes a switching power supply having an isolation transformer 364 so that the power can be derived from the user side of the isolation barrier transferred through the isolation barrier provided by the transformer and applied to the components of the interface device on the line side of the isolation barrier independent of signals transmitted over the line 312. Preferably, the switching power supply 360 derives power from the xDSL modem power supply represented as Vm, typically the ubiquitous 3.3VDC or 5.0VDC power supplies available in such modems. In the embodiment shown, the switching power supply is preferably a resonant mode switching power supply and includes a controller 362 which receives the input DC voltage Vm and provides an output voltage at a frequency set by the controller which is applied to the primary winding of the transformer 364. In the preferred embodiment the controller operates at frequencies of 1 MHZ and above and therefore, the isolation transformer used therein can be sufficiently small to achieve the objectives described above. The secondary of the transformer is connected to an output filter which converts the high frequency signal it receives through the transformer and provides a DC output. The ratio of the secondary and primary of the transformer is such that the DC voltage output +Vd and −Vd are at the desired levels for powering the components of the interface device on the line side of the isolation barrier. In the case where Vm is 3.3VDC or 5VDC and the outputs +Vd and −Vd are +15VDC and −15VDC, the ratio can be used to step up the voltage as required.

In should be appreciated that various modifications can be made to this embodiment without departing from the scope of the invention. For example, while the output of the isolation amplifier 340 is shown as providing a single output applied to a single input of the line driver 320, the output of isolation amplifier 340 (which preferably is provided by an output diode) can be made double ended (for example, by connecting both ends of the output diode respectively to the two inputs of a differential line driver). Similarly, while the output of the isolation amplifier 350 is shown as providing a single output applied to the output terminal RX, the output of the isolation amplifier 350 (which preferably is provided by an output diode) can be made double ended (for example, by connecting both ends of the output diode respectively to the output terminal RX and system ground). In addition, the necessary galvanic isolation between the communication device and the xDSL line can be achieved using other isolation techniques such as capacitance.

Figure 4:
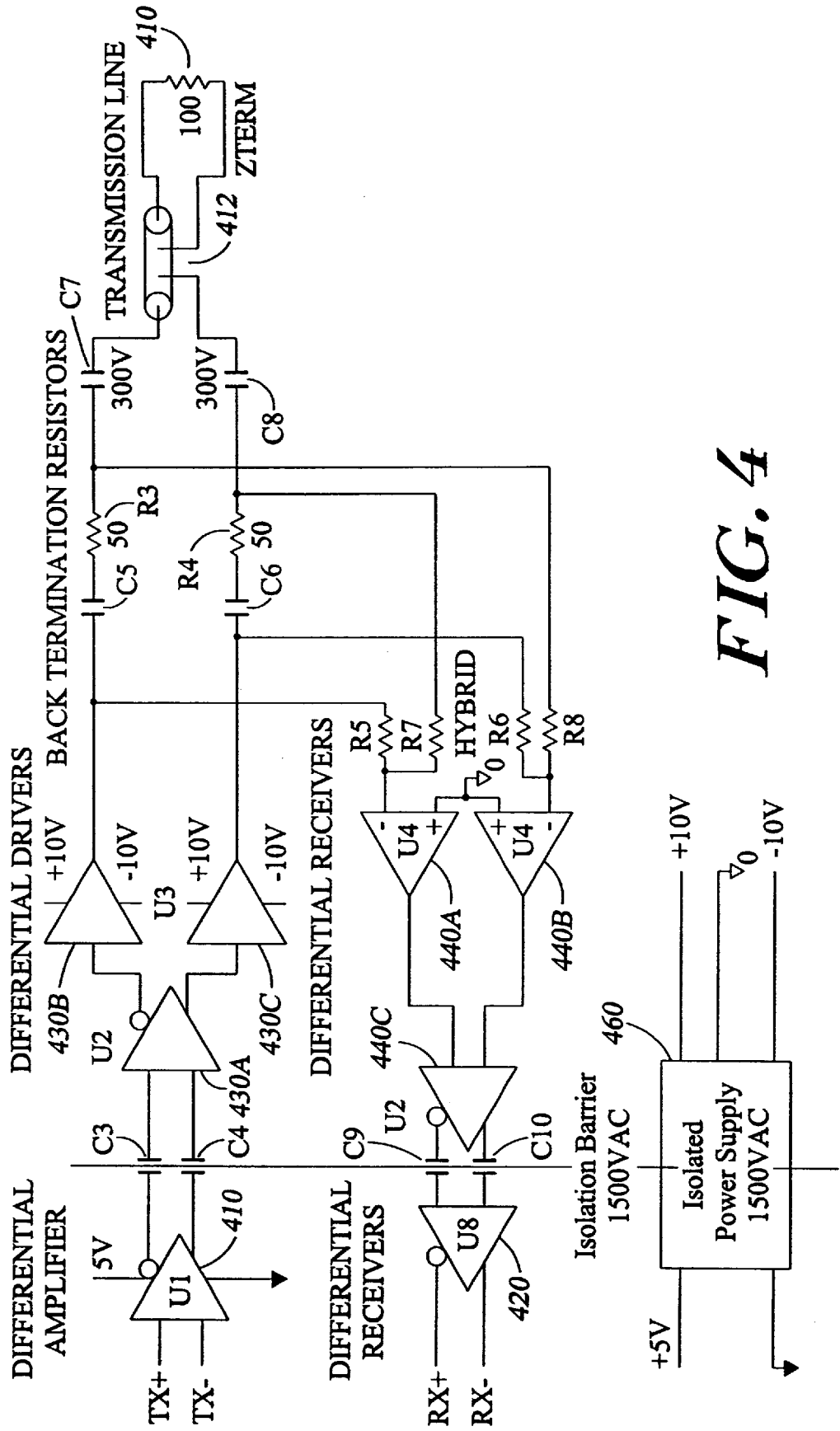
FIG. 4 is a diagrammatic view of another embodiment of a line interface device in accordance with the present invention using capacitance isolation techniques.

Referring to FIG. 4, a preferred embodiment of the interface device is described using capacitors to provide the galvanic isolation barrier between the user side and the line side. In this embodiment, a double ended design is preferably employed with the transmitting and receiving amplifier stages on the user side being differential amplifiers, 410 and 420, respectively. The transmit differential amplifier 410 has its outputs connected to the plates of capacitors C3 and C4 on the user side, while the plates of capacitors C3 and C4 on the line side are connected to the differential inputs of the input stage 430A of the transmit differential driver arrangement 430. The two outputs of the input stage 430A, one for negative and the other for positive polarity signals, are applied to respective inputs of the drivers 430B and 430C. The outputs of the two drivers 430B and 430C are applied to the respective capacitors C5 and C6, which in turn are correspondingly connected through the back termination resistors R3 and R4. Resistors R3 and R4 are respectively connected in series with the capacitors C7 and C8, which in turn are connected to the transmission line 412, the latter being connected to the central office 410. The junction node between the capacitor C5 and driver 430B and the junction node between the capacitor C6 and driver 430C are connected respectively through the input resistors R5 and R6 to the two inverting inputs of the differential receiver drivers 440A and 440B of a hybrid arrangement. The junction node between the resistor R3 and capacitor C7 and the junction between resistor R4 and capacitor C8 are also connected respectively through the input resistors R7 and R8 to the two inverting inputs of the receivers 440A and 440B. The two non-inverting inputs of the of differential receivers are connected together and to system ground. The outputs of the receivers 440A and 440B are respectively connected to the differential inputs of the driver 440C. The latter has its outputs respectively connected to the plates of the capacitors C9 and C10 on the line side. The plates of the capacitors C9 and C10, on the user side, are connect to the respective inputs of the differential receiver 420, the latter having its outputs providing the RX+ and RX– signals respectively. The isolated power supply 460, which can be made similar to the power supply 360 of FIG. 3, although the voltage supplied for this particular embodiment is + and –10VDC for the line drivers used. Obviously, the required voltage used will depend on the specific drivers used in any embodiment of the present invention, with the voltage easily provided by altering the ratio of input and output turns of the transformer used in the power supply. In FIG. 4 it should be evident that capacitors C3, C4, C9 and C10 define the galvanic isolation interface between the user and the line, preferably providing the required isolation barrier. In this specific case, capacitors which can withstand 1500Vrms have a nominal value of 10 pf. The capacitors can be formed as a discrete component separate from the IC package, or packages, or as taught in copending U.S. patent application Ser. No. 09/404,481, filed on the same day as the present application, the capacitor may be formed in silicon, which can be the same as the silicon chip or chips containing one or more other components of the interface device, or a separate piece of silicon that is then included in an IC package with the other components.

As one of ordinary skill will appreciate, the present invention can also be used in other communication devices for transmitting signals over lines which otherwise would have insufficient power to operate the amplifier stages on the line side. For example, the present invention can be used in a broadband cable modem. The difference between the broadband cable modem and the xDSL modem described above is that different voltage requirements for the components of the interface device on the line side of the isolation barrier are different for broadband cable modems.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An isolated line interface device for coupling a data communications device to a data communications medium of the type having insufficient operating power levels to provide operating power to said interface device components on the medium side of the interface device, said isolated line interface device comprising:
   an interface defining an isolation barrier between the device and the medium;
   a transmit amplifier stage constructed and arranged so as to transmit signals received from the device through the isolation barrier over the medium;
   a receive amplifier stage constructed and arranged so as to receive signals from the medium and transmit the received signals through the barrier to the communication device; and
   a switching power supply including a power isolation barrier constructed and arranged so as to transmit a power signal from a source independent of the medium to the transmit and receive amplifier stages so as to power the stages independent of signal transmission through the medium.

2. An interface device according to claim 1, wherein the interface is an optical interface.

3. An interface device according to claim 1, wherein the power supply is a resonant mode switching power supply.

4. An interface device according to claim 1, wherein the power isolation barrier includes a transformer.

5. An interface device according to claim 4, wherein the transformer is a step up transformer.

6. An interface device according to claim 4, wherein the switching power supply is operated at a high frequency so as to reduce the size of the transformer.

7. An interface device according to claim 1, wherein the medium is an xDSL line.

8. An interface device according to claim 1, wherein the medium is an ADSL line.

9. An interface device according to claim 1, wherein the voltage provided by said power supply to the amplifier stages is on the order of ±5VDC.

10. An interface device according to claim 9, wherein the input voltage provided to said power supply is ±3.3VDC.

11. An interface device according to claim 10, wherein the input voltage provided to said power supply is ±5VDC.

12. An interface device according to claim 1, wherein the interface is a capacitive interface.

13. An interface device according to claim 12, wherein the capacitive interface is formed in silicon.

14. An interface device according to claim 1, wherein the isolation barriers provide isolation of at least 1500V.

15. A modem assembly comprising:
  a data pump; and
  an isolated line interface device constructed and arranged so as to couple the modem to a data communications medium of the type having insufficient operating power levels to provide operating power to said interface device components on the medium side of the interface device, the isolated line interface device comprising:
    an interface defining an isolation barrier between the device and the medium;
    a transmit amplifier stage constructed and arranged so as to transmit signals received from the device through the isolation barrier over the medium;
    a receive amplifier stage constructed and arranged so as to receive signals from the medium and transmit the received signals through the barrier to the communication device; and
    a switching power supply including a power isolation barrier constructed and arranged so as to transmit a power signal from a source independent of the medium to the transmit and receive amplifier stages so as to power the stages independent of signal transmission through the medium.

16. A modem assembly according to claim 15, wherein the interface is an optical interface.

17. A modem assembly according to claim 15, wherein the power supply is a resonant mode switching power supply.

18. A modem assembly according to claim 15, wherein the power isolation barrier includes a transformer.

19. A modem assembly according to claim 18, wherein the transformer is a step up transformer.

20. A modem assembly according to claim 18, wherein the switching power supply is operated at a high frequency so as to reduce the size of the transformer.

21. A modem assembly according to claim 16, wherein the medium is an xDSL line.

22. A modem assembly according to claim 16, wherein the medium is an ADSL line.

23. A modem assembly according to claim 16, wherein the voltage provided by said power supply to the amplifier stages is on the order of ±15VDC.

24. A modem assembly according to claim 23, wherein the input voltage provided to said power supply is ±3.3VDC.

25. A modem assembly according to claim 24, wherein the input voltage provided to said power supply is ±5VDC.

26. A modem assembly according to claim 15, wherein the interface is a capacitive interface.

27. A modem assembly according to claim 26, wherein the capacitive interface is formed in silicon.

28. A modem assembly according to claim 15, wherein said isolation barriers provide isolation of at least 1500V.

29. A method of coupling a data communications device to a data communications medium of the type having insufficient operating power levels using an isolated interface device so as to provide operating power to said interface device components on the medium side of the interface device, the method comprising:
  providing an interface defining an isolation barrier between the device and the medium;
  transmitting any signals received from the device through the isolation barrier over the medium;
  receiving any signals from the medium and transmitting the received signals through the barrier to the communication device; and
  using a switching power supply including a power isolation barrier for transmitting a power signal from a source independent of the medium to the transmit and receive amplifier stages so as to power the stages independent of signal transmission through the medium.

30. A method according to claim 29, wherein the interface is an optical interface.

31. A method according to claim 29, wherein the power supply is a resonant mode switching power supply.

32. A method according to claim 29, wherein the power isolation barrier includes a transformer.

33. A method according to claim 32, wherein the transformer is a step up transformer.

34. A method according to claim 32, wherein the switching power supply is operated at a high frequency so as to reduce the size of the transformer.

35. A method according to claim 29, wherein the medium is an xDSL line.

36. A method according to claim 29, wherein the medium is an ADSL line.

37. A method according to claim 29, wherein the voltage provided by said power supply to the amplifier stages is on the order of ±15VDC.

38. A method according to claim 37, wherein the input voltage provided to said power supply is ±3.3VDC.

39. A method according to claim 38, wherein the input voltage provided to said power supply is ±5VDC.

40. A method according to claim 38, wherein the interface is a capacitive interface.

41. A method according to claim 40, wherein the capacitive interface is formed in silicon.

42. A method according to claim 38, wherein the isolation barriers provide isolation of at least 1500V.

43. A method of coupling an modem to a data communications medium through an isolated line interface device, wherein the medium is of the type having insufficient operating power levels to provide operating power to the interface device, the method comprising:
  using the isolated line interface device to couple the modem to the data communications medium such that the interface is used to define an isolation barrier between the device and the medium;
  a transmit amplifier stage is used to transmit signals received from the device through the isolation barrier over the medium;
  a receive amplifier stage is used to receive signals from the medium and transmit the received signals through the barrier to the communication device; and
  connecting a switching power supply through a power isolation barrier so that a power signal is transmitted from a source independent of the medium to the transmit and receive amplifier stages so as to power the stages independent of signal transmission through the medium.

44. A method according to claim 43, wherein the interface is an optical interface.

45. A method according to claim 43, wherein the power supply is a resonant mode switching power supply.

46. A method according to claim 43, wherein the power isolation barrier includes a transformer.

47. A method according to claim 46, wherein the transformer is a step up transformer.

48. A method according to claim 47, wherein the switching power supply is operated at a high frequency so as to reduce the size of the transformer.

49. A method according to claim 43, wherein the medium is an xDSL line.

50. A method according to claim 43, wherein the medium is an ADSL line.

51. A method according to claim 43, wherein the voltage provided by said power supply to the amplifier stages is on the order of ±15VDC.

52. A method according to claim 51, wherein the input voltage provided to said power supply is ±3.3VDC.

53. A method according to claim 51, wherein the input voltage provided to said power supply is ±5VDC.

54. A method according to claim 43, wherein the interface is a capacitive interface.

55. A method according to claim 54, wherein the capacitive interface is formed in silicon.

56. A method according to claim 43, wherein said isolation barriers provide isolation of at least 1500V.

* * * * *